United States Patent [19]

Ollivier et al.

[11] Patent Number: 4,797,046
[45] Date of Patent: Jan. 10, 1989

[54] FASTENING UNIT WITH NAIL ANCHORAGE

[75] Inventors: Jean Ollivier, Valence; Jean-Paul Barthomeuf, Alixan, both of France

[73] Assignee: Societe de Prospection et D'Inventions Techniques (S.P.I.T.), Paris, France

[21] Appl. No.: 132,394

[22] Filed: Dec. 15, 1987

[30] Foreign Application Priority Data

Dec. 16, 1986 [FR] France ................ 86 17552

[51] Int. Cl.$^4$ ............. F16B 15/00; F16B 13/04
[52] U.S. Cl. ........................ 411/448; 411/78; 411/79; 411/922
[58] Field of Search .......... 411/75, 79, 80, 358, 411/447, 448, 922, 78

[56] References Cited

U.S. PATENT DOCUMENTS

| 2,748,594 | 6/1956 | Edwards | 72/105 |
|---|---|---|---|
| 4,116,105 | 9/1978 | Herman | |
| 4,275,637 | 6/1981 | Herg et al. | 411/78 |
| 4,412,615 | 1/1982 | Herg | 411/78 |
| 4,427,327 | 1/1984 | Herg | 411/78 |
| 4,456,416 | 6/1984 | Schlein | 411/447 |

FOREIGN PATENT DOCUMENTS

| 0020919 | 4/1980 | European Pat. Off. | |
|---|---|---|---|
| 2905337 | 8/1980 | European Pat. Off. | |
| 0040300 | 3/1981 | European Pat. Off. | |
| 0186622 | 11/1985 | European Pat. Off. | |
| 425927 | 4/1911 | France | 411/358 |
| 85/03332 | 8/1985 | PCT Int'l Appl. | |
| 212426 | 3/1924 | United Kingdom | 411/358 |

Primary Examiner—Neill R. Wilson
Attorney, Agent, or Firm—Thomas W. Buckman; Neal C. Johnson

[57] ABSTRACT

A fastening unit with nail anchorage, is provided including a cylindrical body with a head and a support leg. The body includes a surface parallel to its axis for guiding an anchorage nail. The leg includes an expansion surface, slanted in one direction with respect to the axis of the body, and a surface for maintaining the nail under pressure, bent back in the other direction towards the axis of the body. The expansion surface extends between the guide surface and the pressure maintenance surface.

1 Claim, 2 Drawing Sheets

FASTENING UNIT WITH NAIL ANCHORAGE

BACKGROUND OF THE INVENTION

1. Field of the Invention

The present invention relates to a fastening unit with nail anchorage intended to be introduced in a hole formed in a reception material, generally cylindrical in shape, which includes a body with a head and which has a surface portion for guiding the anchorage nail parallel to the axis of the unit, and a support leg for the nail which includes an expansion surface portion slanted in a direction with respect to the axis of the fastening unit.

The invention relates generally to a fastening unit for masonry work and, more particularly, a unit for fixing pieces to a ceiling.

If a limited crack forms in a fastening unit reception zone, it is indispensable for the unit to remain sufficiently anchored.

The fastening units known up to present do not provide a completely satisfactory solution to such a problem, not only from the technical point of view but also from the economic point of view considered simultaneously.

2. Description of the Prior Art

The European Pat. No. 0.020 919 teaches a fastening unit with nail anchorage of the above mentioned type. Besides the fact that the head of the body is in this case formed by bending the leg, the portion of the nail extending beyond the curvature, or the bending caused by the slanted expansion surface of the support leg when the nail is driven in, follows a rectilinear path along this slanted surface, which is not propitious to maintaining an adequate resilient pressure on the wall of the receiving hole when, after formation of a crack, its opening is enlarged. It is not certain that such a fastening unit will remain anchored in a crack.

The applicant already knows the American Pat. No. 4 116 105 which also describes a fastening unit with nail anchorage. This fastening unit includes a ball, slanted with respect to the axis of the unit for receiving the nail and the nail is arranged so as to bend, when it is driven in, in contact with the wall of the reception hole and then to follow the joint surface between the body of the unit and the wall of the hole.

It is true that the nail undergoes bending on coming out of the bore. But, not only does the bending angle of the nail depend only on the resistance of the receving material and that of the body of the fastening unit and, in this respect, is difficult to master, but bending of the nail is further accompanied by a deformation of its section.

SUMMARY OF THE INVENTION

The present invention aims at overcoming these drawbacks.

For this, the present invention provides a fastening unit of the above mentioned type, wherein the expansion surface portion of the support leg extends between the guide surface portion of the body and another surface portion, on the support leg, for holding the nail under pressure, bent back in the other direction towards the axis of the fastening unit, so as to allow double resilient deformation of the nail.

With the fastening unit of the invention, when it is driven in the nail undergoes first of all on the expansion surface a first flexion in one direction, towards the wall of the hole, then, on the wall of the receiving hole whose resistance is greater than the flexion resistance of the nail, a second flexion, in the other direction, towards the axis of the fastening unit, is made possible by the clearance between the two adjacent expansion and pressure maintenance surfaces. Because of the two resilient deformations thus undergone by the nail, the angle of the second one depending on this clearance and on the resistance of the receiving material, in the case of cracking and so enlargement of the anchorage hole, the nail, under the action of this resilient force, comes into contact with the wall of the hole which maintains the fastening unit under sufficient pressure in the hole.

In the preferred embodiment of the fastening unit of the invention of the present application, said other pressure maintenance surface portion of the support leg extends parallel to the axis of the unit, the end of the nail has an ogival shape and the nail guide surface portion of the body is formed by the internal wall of a cylindrical split jacket portion adapted for enveloping the nail.

BRIEF DESCRIPTION OF THE DRAWINGS

The invention will be better understood from the following description of several embodiments of the fastening unit of the invention, with reference to the accompanying drawings in which.

DESCRIPTION OF THE PREFERRED EMBODIMENT

Figure 1:
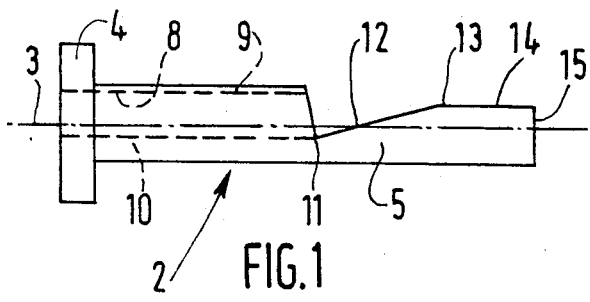
FIG. 1 shows a side view of a first embodiment of the fastening unit of the invention.
Figure 2:
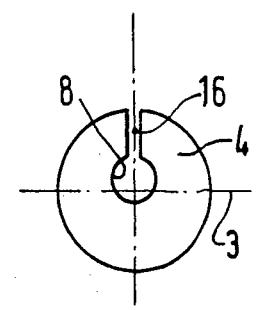
FIG. 2 shows an end view of the fastening unit of FIG. 1, on the head side.
Figure 4:
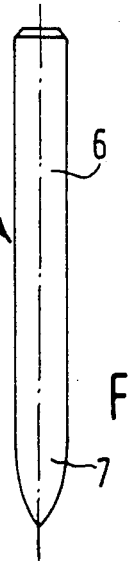
FIG. 4 shows a view of the nail of the fastening unit of the invention.
Figure 3:
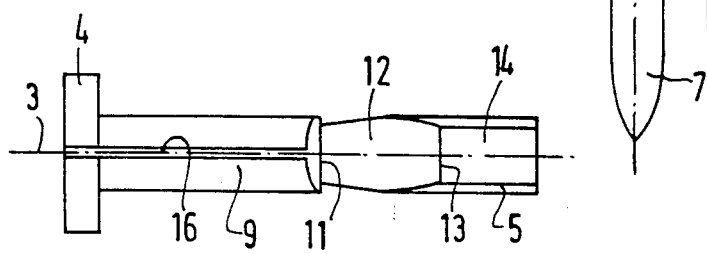
FIG. 3 shows a top view of the unit of FIG. 1.

Referring to FIGS. 1 to 2, the fastening unit 2 with a nail anchorage of the invention has a general cylindrical shape with axis 3 and includes a body 9, 10 with a head 4 and a support leg 5.

The anchorage nail 1 is formed of a cylindrical shank 6, without a head, extended by a front end part 7 with an ogival form. The body is formed with a bore 8 for receiving the nail 1, parallel to axis 3 but offcentered with respect thereto, of a diameter corresponding to the section of shank 6 of nail 1 and forming, about the axial plane parallel to the plane of FIG. 1, two zones, one of small thickness 9 and the other of a greater thickness 10. Bore 8 extends from head 4, through which it passes, over a cylindrical guide jacket portion. From an opening opposite head 4 of bore 8, and more precisely from an edge 11 tangent to bore 8 in a zone 10 of greatest thickness, the support leg has been machined, so as to form on the one hand, a flat expansion surface 12 between edge 11 and an intermediate edge 13 slanting with respect to axis 3 in a direction extending the zone of small thickness and, on the other hand, another flat surface 14 between edge 13 and the end 15 of the support leg. Surface 14 does not extend parallel to surface 12, it is bent back in the opposite direction, that is to say towards the extension of zone 10 of greatest thickness, and in this case it is parallel to axis 3. Between head 4 and edge 11, but rather the body is therefore formed of a cylindrical jacket portion with an offcentered bore.

Finally, to complete the description of the fastening unit of FIGS. 1 to 6, the body, in its zone of smaller thickness 9, includes a lateral slit 16 which here extends parallel to axis 3 substantially in the axial plane parallel to the plane of FIG. 1. Slit 16 is extended into the head.

The length of nail 1 is sufficiently great for its cylindrical shank 6 to reach surface 14.

Head 4 serves for holding in position the part to be fixed, which will be discussed further on, and for introducing the nail 1, the wall of bore 8 for guiding the nail, surface 12 for expansion of the fastening unit and surface 14 for maintaining the nail under pressure.

Figure 5:
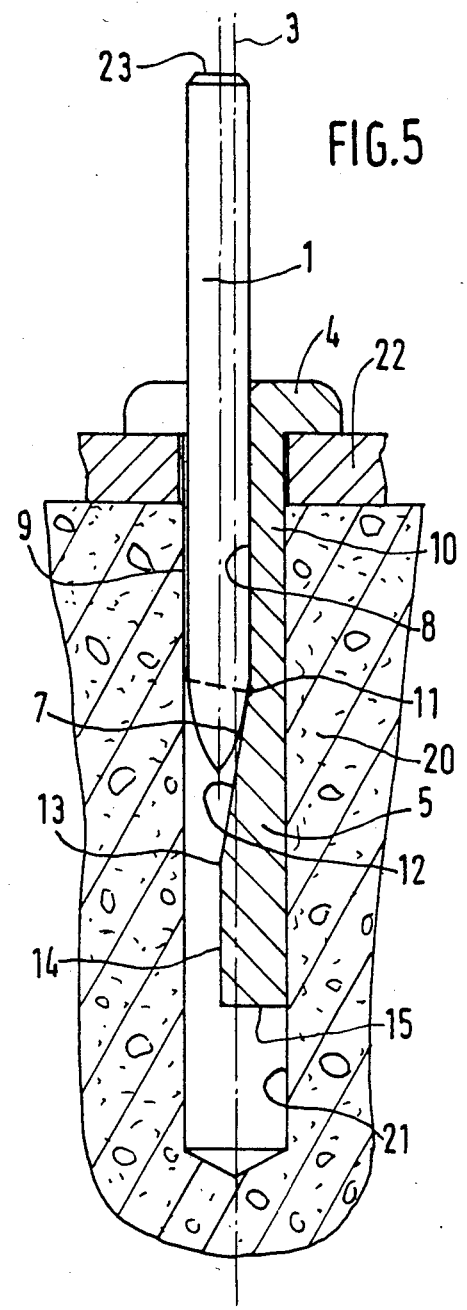
FIG. 5 shows a view in partial axial section of the fastening unit of FIG. 1, driven into a receiving hole.

With the structure of the fastening unit thus described, with reference to FIGS. 5 and 6 its operation will now be described.

In a construction material 20 a hole 21 is bored of the same diameter as the fastening unit, sufficiently deep so that the nail does not abut against the bottom thereof. Through a part to be fixed 22 the fastening unit is introduced manually into hole 21 and, using a hammer for example, the end 23 of the nail opposite its ogive 3 is struck. Since the resistance to movement in the hole of the body of the fastening unit is small, nail 1 cooperates, by its ogive 7, with the expansion surface 12, serving first of all as stop therefor, for driving the body into the hole until head 4 applies part 22 against the receiving material 20 (FIG. 5).

Continuing to strike the end of the nail, it is forced between the expansion surface 12 and the opposite free part of the surface of the receiving hole 20, which causes the nail to bend from edge 11, in the direction of this wall part, the nail mating to a certain extent with the expansion surface 12. Such bending is moreover facilitated by slit 16.

Since the ogive 7 of the nail is shaped so as to offer a contact plane with the support leg and so as to play a role of deflector on the wall of the receiving hole, from the moment when a certain part of this ogive reaches the support position between edge 13 and the free opposite part of the surface of hole 21, and with the nail continuing to be struck, and since the resistance to compression of material 20 by nail 1 is greater than the resistance to bending of nail 1, a second flexion of the nail is caused from edge 13 and, in the direction opposite that of the first flexion, towards the support leg, the nail being gradually bent back towards the pressure maintenance surface 14. It is this surface 14 or, more precisely, the clearance between the two adjacent surfaces 12, 14 which allows this second reverse flexion (FIG. 6).

Figure 6:
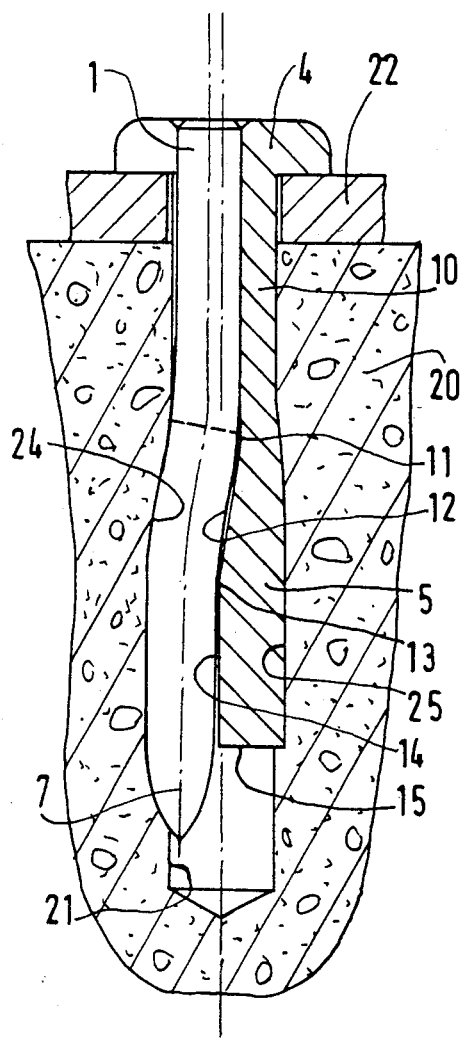
FIG. 6 shows a views in partial axial section of the fastening unit of FIG. 5, in the anchored position.

As soon as the nail clears the zone of the edge 11 of the support leg, it causes compression of the wall of hole 21 not only in its part 24 opposite the leg of the fastening unit but also in its part 25 in contact with the support leg 5, thus slightly enlarging the section of the hole, as can be seen in FIG. 6. It is under these conditions that we may then speak of expansion of the fastening unit.

When the end 23 of nail 1 is flush with the front surface of head 4, the ogive 7 of the nail extends axially beyond the end 15 of the support leg. Anchorage of the fastening unit is then achieved and the operator may make sure thereof by a visual check.

Should a tractive force be exerted on the body of the fastening unit, by its head 4, nail 1 remains in position in the receiving material, its two flexions preventing it from sliding in the fastening unit which, from this point of view, may be termed self locking.

Because of the two resilient flexions or deformations undergone by the nail, in the case of limited cracking of the nail, under the action of this resilient force, comes into contact with the wall of the hole so as to maintain the fastening unit therein under a certain pressure.

It will be noted that the pressure maintenance surface 14 of the nail does not necessarily have to be parallel to axis 3. It is sufficient for a clearance to be formed between the two adjacent surfaces 12, 14.

The cylindrical shank 6 of nail 1 could be extended by a pyramid, a cone or else be truncated obliquely.

Figure 7:
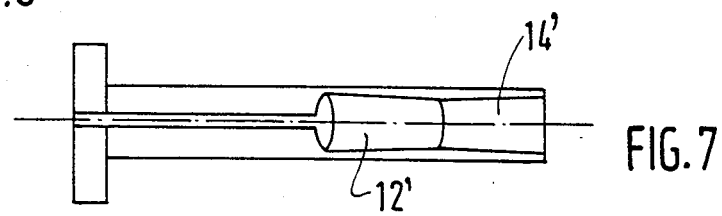
FIG. 7 shows a top view of a second embodiment of the fastening unit of the invention.

The variant of construction shown in FIG. 7 is identical to the embodiment shown in FIGS. 1 to 6, except for the fact that the expansion surface 12′ and surface 14′ for maintaining the nail under pressure, instead of being flat, are concave curved surfaces.

The other elements of the fastening unit are the same and have not been referenced.

Figure 8:
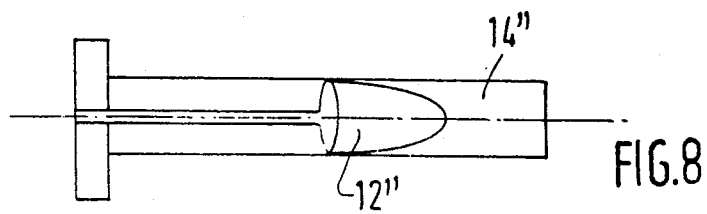
FIG. 8 shows a top view of a third embodiment of the fastening unit of the invention.

The variant of construction shown in FIG. 8 is identical to the other two, except for the fact that the expansion surface 12″ is a concave curved surface and the pressure maintenance surface 14″ is flat.

Purely by way of indication and without any limitation of the scope of the patent, the fastening unit of the invention may be made from steel, aluminium, brass or a plastic material, and the anchorage nail, in any case made from a rigid, resistent and resilient material may for example be made from treated steel or any other equivalent material.

What is claimed is:

1. A fastening unit adapted to anchor a part to a wall or ceiling structure having a cylindrical bore defined therein, said unit comprising a nail guide member receivable snugly within said bore and a nail receivable within said guide member, said nail guide member having, in axially successive relation, an elongated opening for receiving said nail, an outwardly slanted nail guide portion, an axially extending guide surface, and terminating in an end surface spaced from the end of said bore, said nail having a pointed end, which upon engagement with the slanted guide portion of said guide member, causes the nail to deflect into engagement with the wall of said bore whereupon the nail is deflected back toward the axial direction when constrained between the bore wall and said axially extending guide surface, said nail when completely driven into said nail guide member having its point extending beyond said end surface whereby the fastening unit is securely fastened to the wall or ceiling structure.

* * * * *